United States Patent
Chen et al.

(10) Patent No.: US 8,308,113 B2
(45) Date of Patent: Nov. 13, 2012

(54) PANEL POSITIONING MECHANISM AND DISPLAY DEVICE WITH DIFFERENT POSITIONING MODES

(75) Inventors: Ta-Wei Chen, Taipei Hsien (TW); Chia-Hsin Hsieh, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 174 days.

(21) Appl. No.: 12/899,550

(22) Filed: Oct. 7, 2010

(65) Prior Publication Data

US 2012/0061530 A1    Mar. 15, 2012

(30) Foreign Application Priority Data

Sep. 10, 2010  (TW) ................................ 99130624 A

(51) Int. Cl.
*F16M 11/00* (2006.01)

(52) U.S. Cl. ............. 248/122.1; 248/291.1; 248/292.13; 248/921; 361/679.27

(58) Field of Classification Search ............... 248/122.1, 248/371, 291.1, 292.11, 292.13, 921, 922, 248/923, 397, 398; 361/679.27
See application file for complete search history.

(56) References Cited

U.S. PATENT DOCUMENTS

| | | | | |
|---|---|---|---|---|
| 7,413,152 | B1 * | 8/2008 | Chen ........................... | 248/176.1 |
| 7,530,541 | B2 * | 5/2009 | Wang et al. ................. | 248/284.1 |
| 7,690,605 | B2 * | 4/2010 | Lee et al. ...................... | 248/133 |
| 8,201,792 | B2 * | 6/2012 | Yuan et al. ................... | 248/299.1 |
| 2003/0122046 | A1 * | 7/2003 | Huong ......................... | 248/291.1 |
| 2007/0152111 | A1 * | 7/2007 | Tang et al. .................. | 248/122.1 |
| 2007/0152125 | A1 * | 7/2007 | Lee .............................. | 248/398 |
| 2010/0123053 | A1 * | 5/2010 | Wang .......................... | 248/125.1 |
| 2010/0252695 | A1 * | 10/2010 | Liu ............................. | 248/125.1 |
| 2012/0061530 | A1 * | 3/2012 | Chen et al. .................. | 248/122.1 |

* cited by examiner

*Primary Examiner* — Ramon Ramirez
(74) *Attorney, Agent, or Firm* — Winston Hsu; Scott Margo

(57) ABSTRACT

A panel positioning mechanism includes a supporting component, and a slot is formed on a side of the supporting component. The panel positioning mechanism further includes a loading component disposed on a side of the supporting component, a rotational spring set connected to the supporting component and the loading component, a fixing component set for fixing the supporting component, the loading component, and the rotational spring set, a contacting component connected to the loading component and disposed inside the slot in a slidable manner so as to constrain rotation of the loading component within a first range, and a releasing component passing through the loading component and fixed on the contacting component for driving a contacting portion of the contacting component to separate from the slot on the supporting component, so that the loading component can rotate outside the first range.

20 Claims, 4 Drawing Sheets

PANEL POSITIONING MECHANISM AND DISPLAY DEVICE WITH DIFFERENT POSITIONING MODES

BACKGROUND OF THE INVENTION

1. Field of the Invention

The present invention relates to a panel positioning mechanism, and more particularly, to a panel positioning mechanism with different positioning modes and a displaying device therewith.

2. Description of the Prior Art

The pivoting mechanism of a common electronic device, such as a supporting module of a notebook computer or a tablet computer, may be of many types, like a continuous pivoting mechanism, a locking pivoting mechanism, and a spindle pivoting mechanism, disposed between an upper casing and a lower casing for adjusting a view angle of the upper casing relative to the lower casing. Generally, movement between a driving component and a passive component of the spindle pivoting mechanism delay easily, so that the spindle pivoting mechanism idles running. The manufacturing cost of the spindle pivoting mechanism is expensive and is unsuitable for popular application. The locking pivoting mechanism merely rotates the upper casing relative to the lower casing at predetermined angles, and the displaying panel can not be adjusted at the preferable view angle according to user's demand. The locking pivoting mechanism is more expensive than the spindle pivoting mechanism, and is unsuitable to be a consumer electronic product. Although the manufacturing cost of the continuous pivoting mechanism is cheaper than the locking pivoting mechanism and the spindle pivoting mechanism, pivoting ranges and functions of the continuous pivoting mechanism, the locking pivoting mechanism and the spindle pivoting mechanism are different. Thus, design of an innovating pivoting mechanism of mixing advantages of the above-said pivoting mechanisms is an important issue of the mechanism industry.

SUMMARY OF THE INVENTION

The present invention provides a panel positioning mechanism with different positioning modes and a displaying device therewith for solving above drawbacks.

According to the claimed invention, a panel positioning mechanism includes a supporting component, and a slot is formed on a side of the supporting component. The panel positioning mechanism further includes a holding component disposed on a side of the supporting component for holding a panel, a rotational spring set connected to the supporting component and the holding component for providing a torque to the holding component when the holding component rotates relative to the supporting component, a fixing component set for fixing the supporting component, the holding component, and the rotational spring set, and a contacting component connected to the holding component. A contacting portion of the contacting component is disposed inside the slot on the supporting component in a slidable manner so as to constrain rotation of the holding component relative to the supporting component within a first range. The panel positioning mechanism further includes a releasing component passing through the holding component and fixed on the contacting component for driving the contacting portion of the contacting component to separate from the slot on the supporting component, so that the holding component rotates relative to the supporting component outside the first range.

According to the claimed invention, the slot on the supporting component is an arc slot.

According to the claimed invention, the panel positioning mechanism further includes a resilient component disposed between the releasing component and the holding component for driving the releasing component to separate from the contacting component when the releasing component is not pressed.

According to the claimed invention, the rotational spring set includes a plurality of sheet springs.

According to the claimed invention, the fixing component set includes a bolt passing through the supporting component, the holding component, and the rotational spring set, and a nut locked on an end of the bolt.

According to the claimed invention, the panel positioning mechanism further includes a plurality of sleeves disposed between the holding component and the contacting component.

According to the claimed invention, the panel positioning mechanism further includes at least one fixing portion disposed on the supporting component for fixing the contacting portion of the contacting component when the holding component rotates relative to the supporting component outside the first range.

According to the claimed invention, the fixing portion is a sunken structure.

According to the claimed invention, a displaying device includes a panel, a base for supporting the panel on a loading plane, a frame connected to the panel for holding the panel, and a panel positioning mechanism disposed between the base and the frame for positioning the panel relative to the loading plane. The panel positioning mechanism includes a supporting component, and a slot is formed on a side of the supporting component. The panel positioning mechanism further includes a holding component disposed on a side of the supporting component for holding a panel, a rotational spring set connected to the supporting component and the holding component for providing a torque to the holding component when the holding component rotates relative to the supporting component, a fixing component set for fixing the supporting component, the holding component, and the rotational spring set, and a contacting component connected to the holding component. A contacting portion of the contacting component is disposed inside the slot on the supporting component in a slidable manner so as to constrain rotation of the holding component relative to the supporting component within a first range. The panel positioning mechanism further includes a releasing component passing through the holding component and fixed on the contacting component for driving the contacting portion of the contacting component to separate from the slot on the supporting component, so that the holding component rotates relative to the supporting component outside the first range.

According to the claimed invention, the contacting portion of the present invention can slide inside the slot, and positions of the contacting portion relative to the slot can be adjusted by pressing the releasing component for adjusting elevation of the panel of the displaying device, so as to adjust the view angle of the panel according to actual demand and to fold the displaying device by rotating the frame close to the base. In addition, the present invention utilizes the fixing component set to lock the supporting component, the holding component, and the rotational spring set. The fixing component set not only has low cost, but also can provide the strong torque with the rotational spring set for preventing the panel positioning mechanism from idle running.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
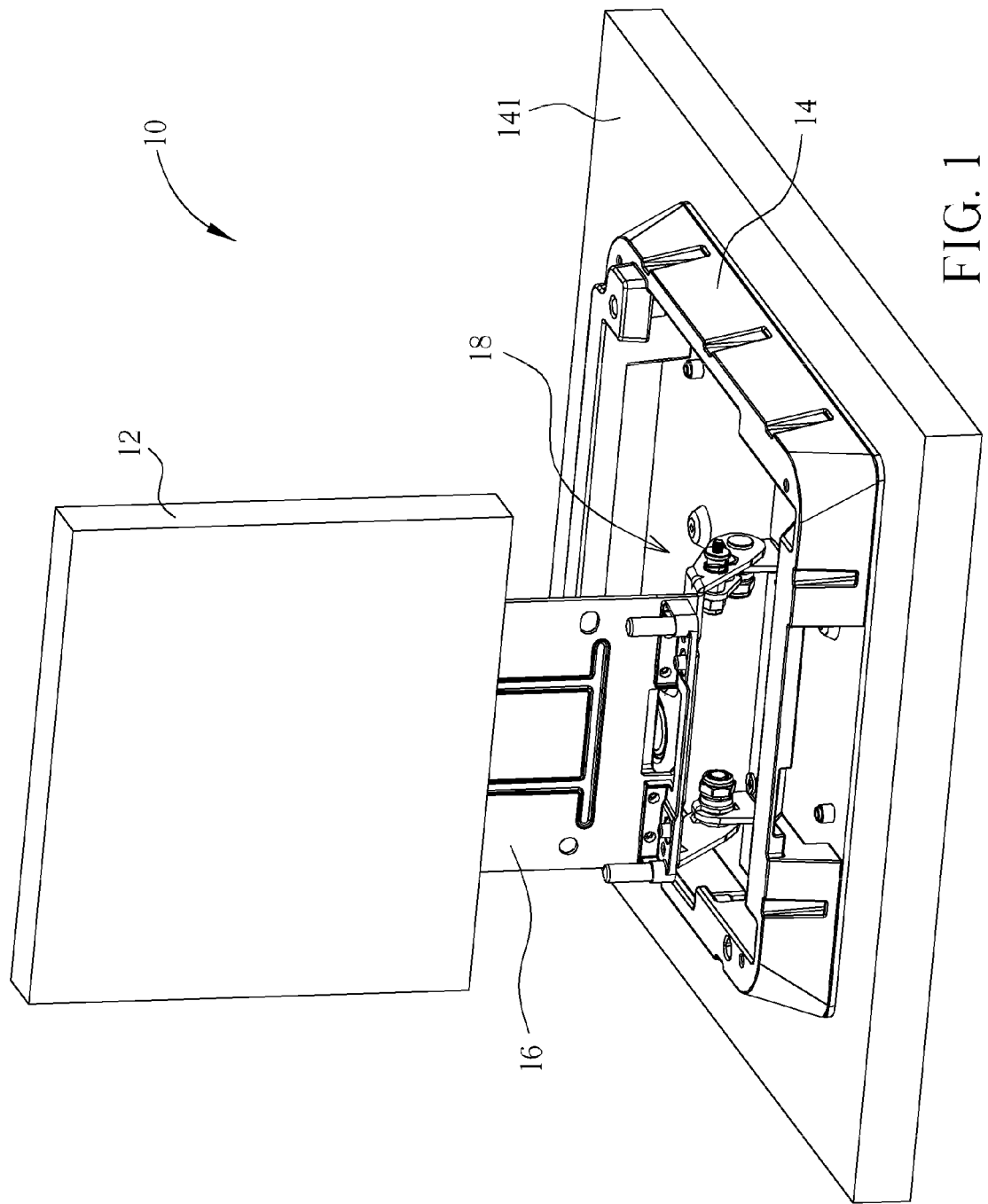
FIG. 1 is an assembly diagram of a displaying device according to a preferred embodiment of the present invention.

Please refer to FIG. 1. FIG. 1 is an assembly diagram of a displaying device 10 according to a preferred embodiment of the present invention. The displaying device 10 includes a panel positioning mechanism with different modes. The displaying device 10 can be a liquid crystal display, an all in one PC, and so on. The displaying device 10 includes a panel 12, such as a tablet computer, a base 14 for supporting the panel 12 on a loading plane 141, and a frame 16 connected to the panel 12 for holding the panel 12. As shown in FIG. 1, an angle is formed between the frame 16 and the base 14, so that the panel 12 of the displaying device 10 can be set at a preferable view angle. The displaying device 10 further includes a panel positioning mechanism 18 disposed between the base 14 and the frame 16 for positioning the frame 16 relative to the base 14, meanwhile positioning an angle between the panel 12 and the loading plane 141, so as to adjust the view angle of the panel 12 according to user's demand.

Figure 2:
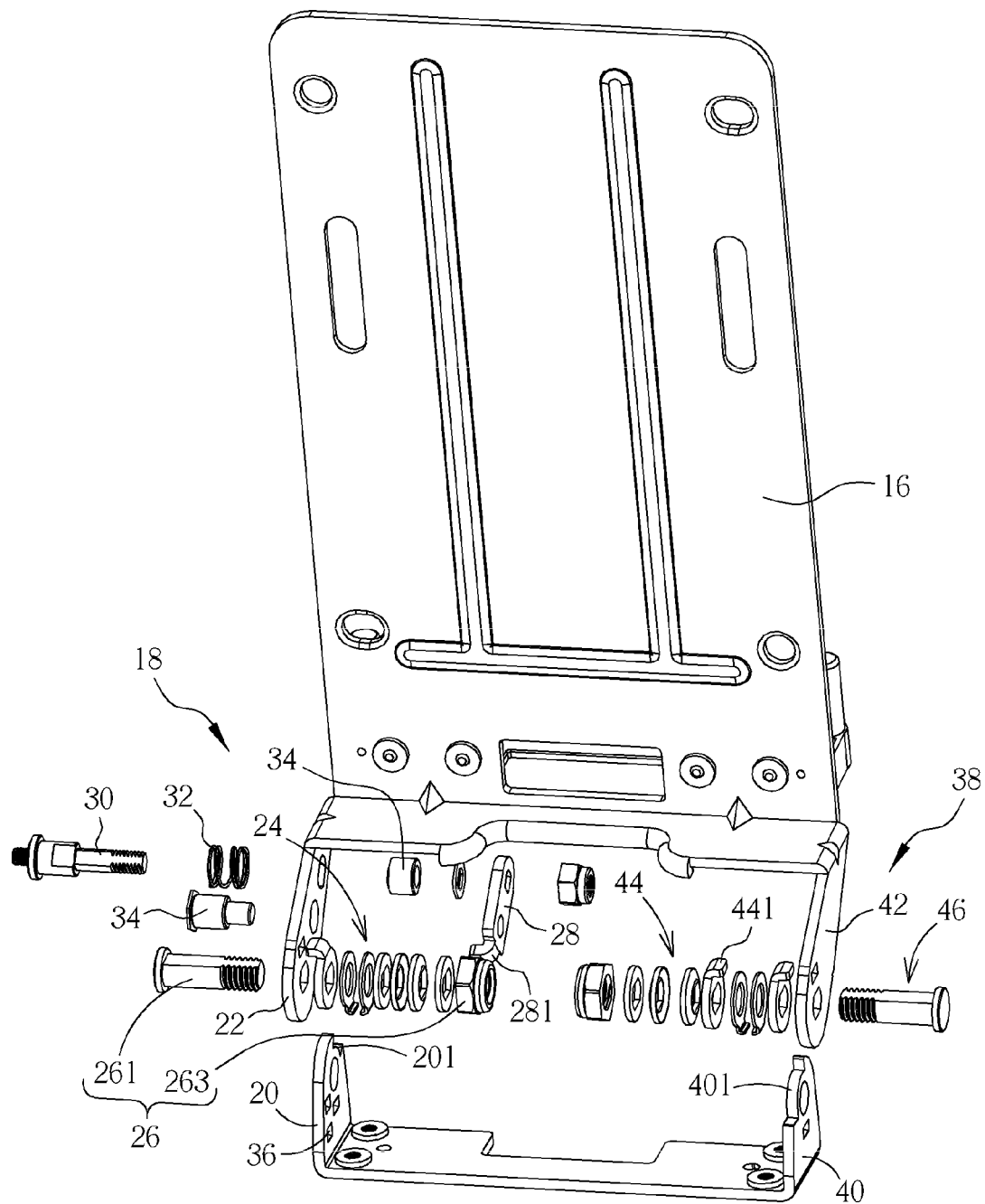
FIG. 2 is an exploded diagram of a panel positioning mechanism according to the preferred embodiment of the present invention.

Please refer to FIG. 1 and FIG. 2. FIG. 2 is an exploded diagram of the panel positioning mechanism 18 according to the preferred embodiment of the present invention. The panel positioning mechanism 18 includes a supporting component 20 connected to a side of the base 14. A slot 201 is formed on a side of the supporting component 20, and the slot 201 can be an arc slot disposed around the pivoting hole. The panel positioning mechanism 18 further includes a holding component 22 disposed on a side of the supporting component 20 and connected to the frame 16 for holding the panel 12 with the frame 16. The panel positioning mechanism 18 further includes a rotational spring set 24 connected to the supporting component 20 and the holding component 22 for providing a torque to the holding component 22 when the holding component 22 rotates relative to the supporting component 20. The rotational spring set 24 can include a plurality of sheet springs, which can be a plurality of spacer-shaped resilient gaskets, for providing a friction torque as being deformed by compression. The panel positioning mechanism 18 further includes a fixing component set 26 for fixing the supporting component 20, the holding component 22, and the rotational spring set 24. The fixing component set 26 can include a plurality of fixing components. For example, the fixing component set 26 can include a bolt 261 passing through the supporting component 22, the holding component 20, and the rotational spring set 24. The fixing component set 26 can further include a nut 263 locked on an end of the bolt 261 for constraining movement of the bolt 261 relative to the supporting component 22, the holding component 20, and the rotational spring set 24.

The panel positioning mechanism 18 further includes a contacting component 28 connected to the holding component 22. The contacting component 28 can be a tongue structure. A contacting portion 281 of the contacting component 28 can be disposed inside the slot 201 on the supporting component 20 in a slidable manner, so as to constrain rotation of the holding component 22 relative to the supporting component 20 within a first range R1. Generally, the first range R1 (an angle formed between the panel 12 and the loading plane 141) can be from 65 degrees to 80 degrees, and is the preferable view angle of the panel 12 for the user. The panel positioning mechanism 18 further includes a releasing component 30 passing through the holding component 22 and fixed on the contacting component 28. The user can drive the contacting portion 281 of the contacting component 28 to separate from the slot 201 on the supporting component 20 by pressing the releasing component 30, so that the holding component 22 can rotate relative to the supporting component 20 outside the first range R1. The panel positioning mechanism 18 can further include a resilient component 32 disposed between the releasing component 30 and the holding component 22 for driving the releasing component 30 to separate from the contacting component 28 when the releasing component 30 is not pressed, so as to move the releasing component 30 back to an initial position. The panel positioning mechanism 18 can further include a plurality of sleeves 34 disposed between the holding component 22 and the contacting component 28 for absorbing pressure generated between the contacting component 28 and the holding component 22 when the releasing component 30 is pressed.

In addition, the panel positioning mechanism 18 can further include at least one fixing portion 36 disposed on the supporting component 20 for fixing the contacting portion 281 of the contacting component 28 when the holding component 22 rotates relative to the supporting component 20 outside the first range R1. Generally, the fixing portion 36 can be a sunken structure similar to the slot 201, for being wedged by the contacting portion 281. Therefore, the panel positioning mechanism 18 can further include a positioning range of the panel 12 relative to the loading plane 141 outside the first range R1. The fixing portion 36 can be an alternative structure, which means that the fixing portion 36 can be omitted, and the holding component 22 can only be positioned relative to the supporting component 20 with the first range R1. The positioning range of the above-mentioned embodiment is designed according to actual demand.

Furthermore, the displaying device 10 can further include an auxiliary panel positioning mechanism 38. The auxiliary panel positioning mechanism 38 includes a supporting component 40 connected to the other side of the base 14, and a holding component 42 disposed on a side of the supporting component 40 and connected to the frame 16 for holding the panel 12 with the frame 16 and the holding component 22. The auxiliary panel positioning mechanism 38 can further include a rotational spring set 44 connected to the supporting component 40 and the holding component 42, and a fixing component set 46 for fixing the supporting component 40, the holding component 42, and the rotational spring set 44. The rotational spring set 44 can provide a torque to the holding component 42 when the holding component 42 rotates relative to the supporting component 40. An arc slot 401 can be formed on a side of the supporting component 40 of the auxiliary panel positioning mechanism 38, and the rotational spring set 44 of the auxiliary panel positioning mechanism 38 can include a contacting portion 441 disposed inside the slot 401 of the supporting component 40 of the auxiliary panel positioning mechanism 38 in a slidable manner, so as to constrain rotation of the holding component 42 relative to the supporting component 40 of the auxiliary panel positioning mechanism 38 within a second range R2 different from the first range R1.

The panel positioning mechanism 18 and the auxiliary panel positioning mechanism 38 are respectively disposed on two ends of junction between the base 14 and the frame 16, and a curvature of the slot 401 of the auxiliary panel positioning mechanism 38 can be substantially identical to a curvature of the slot 201 of the panel positioning mechanism 18, so that the frame 16 can rotate relative to the base 14. The panel positioning mechanism 18 controls the frame 16 to rotate relative to the base 14 within the first range R1, so as to adjust the best view angle of the panel 12. The auxiliary panel positioning mechanism 38 controls the frame 16 to rotate relative to the base 14 with the panel positioning mechanism 18, and can fold the frame 16 close to the base 14 when the frame 16 rotates relative to the base 14 outside the first range R1, which means that the displaying device 10 can be folded to a minimal volume for convenient carriage as the contacting portion 441 slides to an end of the arc slot 401 and the frame 16 is positioned close to the base 14. Therefore, a length of the slot 401 of the auxiliary panel positioning mechanism 38 is greater than a length of the slot 201 of the panel positioning mechanism 18, which means the second range R2 is greater than the first range R1. Generally, the second range R2 (an angle between the panel 12 and the loading plane 141) can be from 0 degree to 85 degrees.

Figure 3:
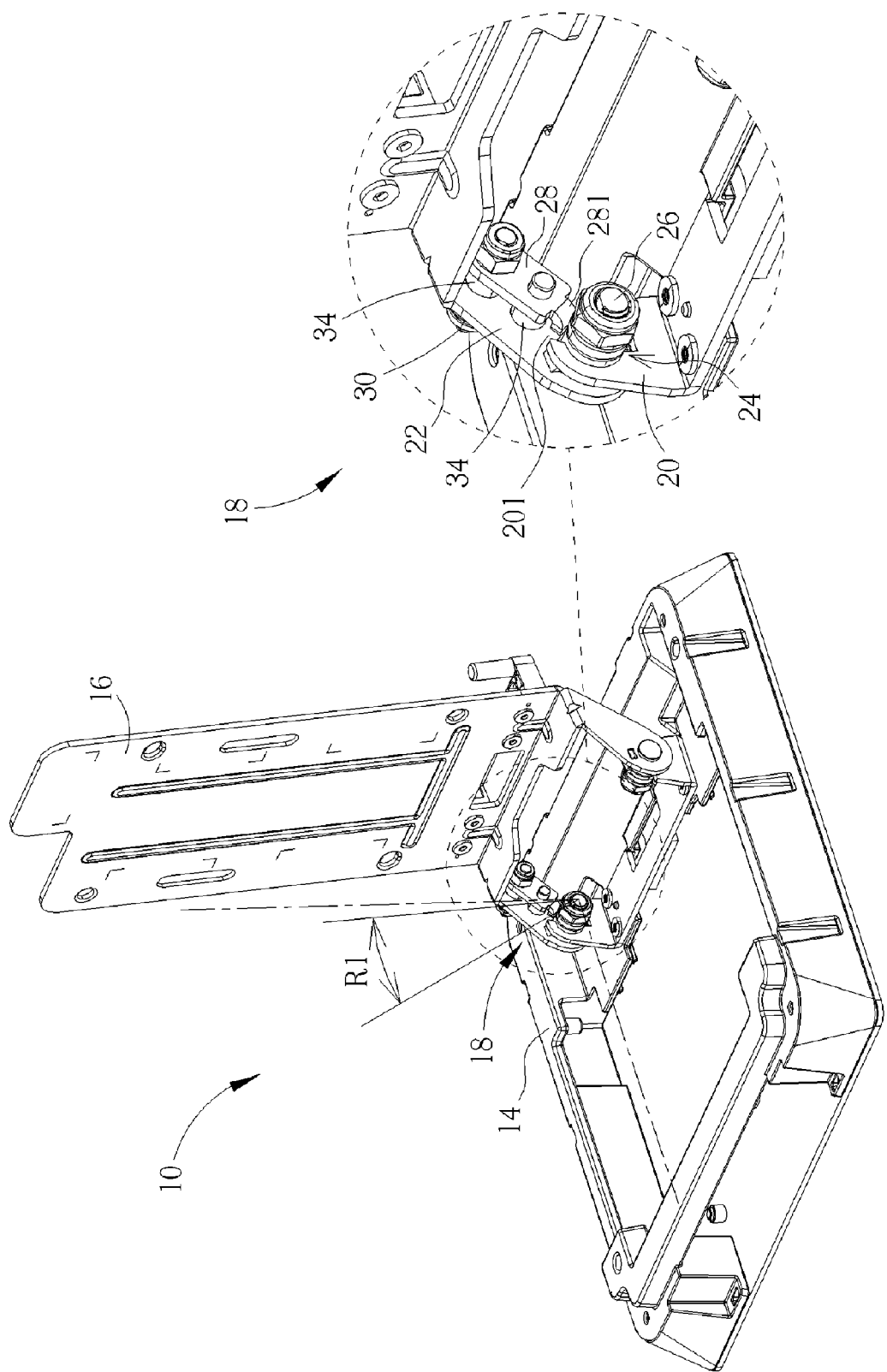
FIG. 3 is a diagram of a contacting portion of the panel positioning mechanism sliding inside a slot according to the preferred embodiment of the present invention.
Figure 4:
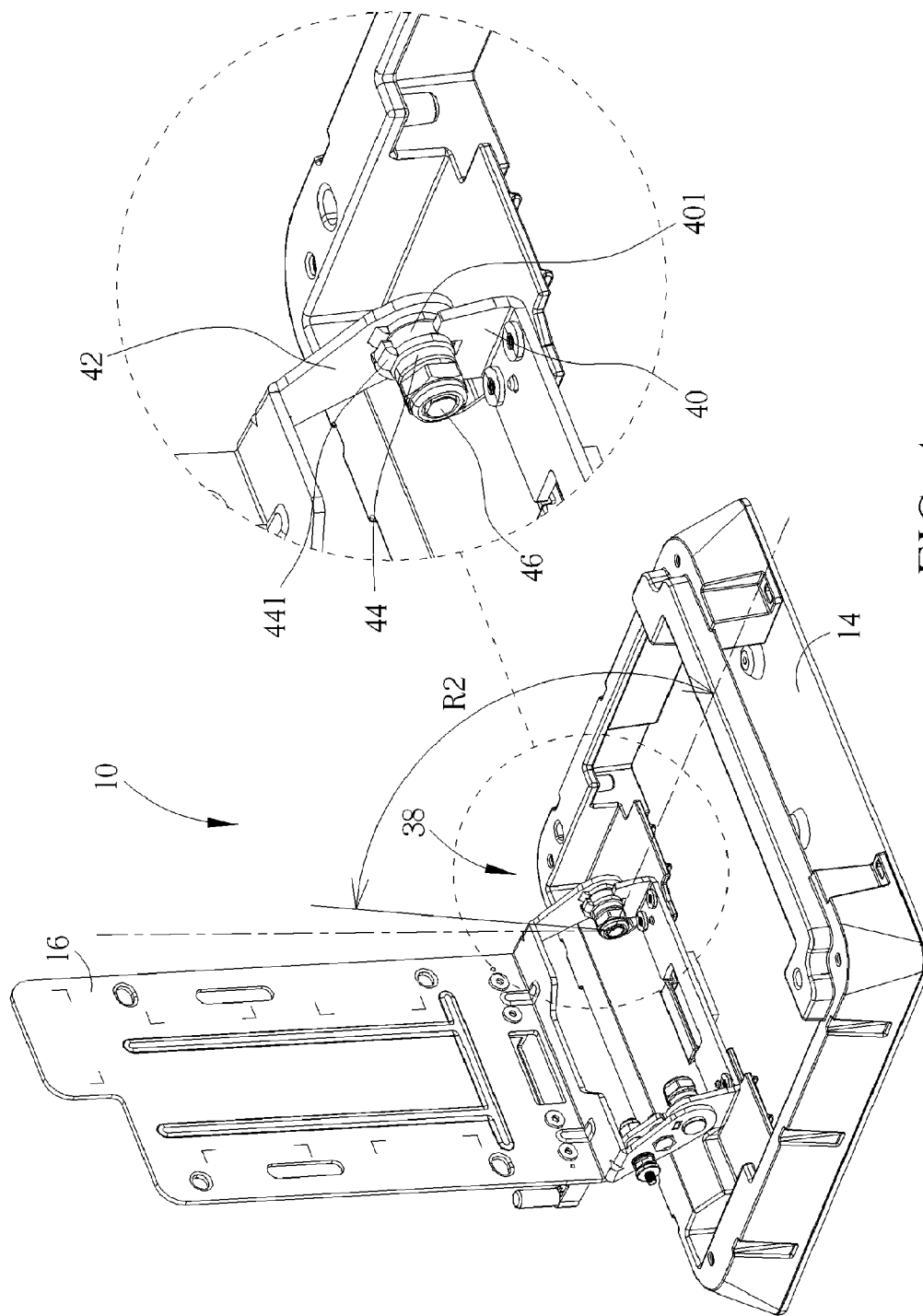
FIG. 4 is a diagram of a contacting portion of an auxiliary panel positioning mechanism sliding inside a slot according to the preferred embodiment of the present invention.

Please refer to FIG. 3 and FIG. 4. FIG. 3 is a diagram of the contacting portion 281 of the panel positioning mechanism 18 sliding inside the slot 201 according to the preferred embodiment of the present invention. FIG. 4 is a diagram of the contacting portion 441 of the auxiliary panel positioning mechanism 38 sliding inside the slot 401 according to the preferred embodiment of the present invention. When the holding component 22 of the displaying device 10 rotates relative to the supporting component 20 within the first range R1, as shown in FIG. 3 and FIG. 4, the contacting portion 281 of the contacting component 28 of the panel positioning mechanism 18 slides inside the slot 201 on the supporting component 20, and the contacting portion 441 of the rotational spring set 44 of the auxiliary panel positioning mechanism 38 slides inside the slot 441 on the supporting component 40 simultaneously, so that the view angle of the panel 12 can be adjusted according to user's demand. Then, as the panel 12 is rotated out of the first range R1 relative to the loading plane 141, the displaying device 10 can be folded by rotating the frame 16 close to the base 14.

The releasing component 30 can be pressed to drive the contacting portion 281 of the contacting component 28 to separate from the slot 201 on the supporting component 20. Meanwhile, the contacting portion 281 slides on a surface of the supporting component 20, and the contacting portion 441 of the auxiliary panel positioning mechanism 38 slides inside the slot 401 on the supporting component 40, so as to adjust the angle between the frame 16 and the base 14 outside the first range R1 and within the second range R2. It should be mentioned that at least one fixing portion 36 can be formed on the supporting component 20 according to design demand. The contacting portion 281 of the panel positioning mechanism 18 can be wedged inside the fixing portion 36 for setting the angle between the frame 16 and the base 14 of the displaying device 10 when the frame 16 moves relative to the supporting component 40 outside the first range R1 and within the second range R2. Therefore, the position of the contacting portion 281 of the contacting component 28 of the displaying device 10 can be adjusted according to actual demand, so as to rotate the frame 16 relative to the base 14 within or outside the first range R1. In addition, the rotational spring set 24 of the panel positioning mechanism 18 and the rotational spring set 44 of the auxiliary panel positioning mechanism 38 can be fixed by the fixing component set 46, such as the bolt, the nut, and the plurality of sheet springs. The fixing component set 46 has low manufacturing cost, and the rotational spring set 24 and the rotational spring set 44 can provide the torques when the holding component 22 rotates relative to the supporting component 20, so as to prevent the idle running between the holding component 22 and the supporting component 20.

Comparing to the prior art, the contacting portion of the present invention can slide inside the slot, and positions of the contacting portion relative to the slot can be adjusted by pressing the releasing component for adjusting elevation of the panel of the displaying device, so as to adjust the view angle of the panel according to actual demand and to fold the displaying device by rotating the frame close to the base. In addition, the present invention utilizes the fixing component set to lock the supporting component, the holding component, and the rotational spring set. The fixing component set not only has low cost, but also can provide the strong torque with the rotational spring set for preventing the panel positioning mechanism from idle running.

Those skilled in the art will readily observe that numerous modifications and alterations of the device and method may be made while retaining the teachings of the invention.

What is claimed is:

1. A panel positioning mechanism comprising:
    a supporting component, a slot being formed on a side of the supporting component;
    a holding component disposed on a side of the supporting component for holding a panel;
    a rotational spring set connected to the supporting component and the holding component for providing a torque to the holding component when the holding component rotates relative to the supporting component;
    a fixing component set for fixing the supporting component, the holding component, and the rotational spring set;
    a contacting component connected to the holding component, a contacting portion of the contacting component being disposed inside the slot on the supporting component in a slidable manner so as to constrain rotation of the holding component relative to the supporting component within a first range; and
    a releasing component passing through the holding component and fixed on the contacting component for driving the contacting portion of the contacting component to separate from the slot on the supporting component, so that the holding component rotates relative to the supporting component outside the first range.

2. The panel positioning mechanism of claim 1, wherein the slot on the supporting component is an arc slot.

3. The panel positioning mechanism of claim 1, further comprising:
    a resilient component disposed between the releasing component and the holding component for driving the releasing component to separate from the contacting component when the releasing component is not pressed.

4. The panel positioning mechanism of claim 1, wherein the rotational spring set comprises a plurality of sheet springs.

5. The panel positioning mechanism of claim 1, wherein the fixing component set comprises:
   a bolt passing through the supporting component, the holding component, and the rotational spring set; and
   a nut locked on an end of the bolt.

6. The panel positioning mechanism of claim 1, further comprising:
   a plurality of sleeves disposed between the holding component and the contacting component.

7. The panel positioning mechanism of claim 1, further comprising:
   at least one fixing portion disposed on the supporting component for fixing the contacting portion of the contacting component when the holding component rotates relative to the supporting component outside the first range.

8. The panel positioning mechanism of claim 7, wherein the fixing portion is a sunken structure.

9. A displaying device comprising:
   a panel;
   a base for supporting the panel on a loading plane;
   a frame connected to the panel for holding the panel; and
   a panel positioning mechanism disposed between the base and the frame for positioning the panel relative to the loading plane, the panel positioning mechanism comprising:
      a supporting component connected to the base, a slot being formed on a side of the supporting component;
      a holding component disposed on a side of the supporting component and connected to the frame for holding the panel;
      a rotational spring set connected to the supporting component and the holding component for providing a torque to the holding component when the holding component rotates relative to the supporting component;
      a fixing component set for fixing the supporting component, the holding component, and the rotational spring set;
      a contacting component connected to the holding component, a contacting portion of the contacting component being disposed inside the slot on the supporting component in a slidable manner so as to constrain rotation of the holding component relative to the supporting component within a first range; and
      a releasing component passing through the holding component and fixed on the contacting component for driving the contacting portion of the contacting component to separate from the slot on the supporting component, so that the holding component rotates relative to the supporting component outside the first range.

10. The displaying device of claim 9, wherein the slot on the supporting component is an arc slot.

11. The displaying device of claim 9, wherein the panel positioning mechanism further comprises:
   a resilient component disposed between the releasing component and the holding component for driving the releasing component to separate from the contacting component when the releasing component is not pressed.

12. The displaying device of claim 9, wherein the rotational spring set of the panel positioning mechanism comprises a plurality of sheet springs.

13. The displaying device of claim 9, wherein the fixing component set of the panel positioning mechanism comprises:
   a bolt passing through the supporting component, the holding component, and the rotational spring set; and
   a nut locked on an end of the bolt.

14. The displaying device of claim 9, wherein the panel positioning mechanism further comprises:
   a plurality of sleeves disposed between the holding component and the contacting component.

15. The displaying device of claim 9, wherein the panel positioning mechanism further comprises at least one fixing portion disposed on the supporting component for fixing the contacting portion of the contacting component when the holding component rotates relative to the supporting component outside the first range.

16. The displaying device of claim 9 further comprising:
   an auxiliary panel positioning mechanism, comprising:
      a supporting component connected to the base;
      a holding component disposed on a side of the supporting component and connected to the frame for holding the panel;
      a rotational spring set connected to the supporting component and the holding component for providing a torque to the holding component when the holding component rotates relative to the supporting component; and
      a fixing component set for fixing the supporting component, the holding component, and the rotational spring set.

17. The displaying device of claim 16, wherein a slot is formed on a side of the supporting component of the auxiliary panel positioning mechanism, and the rotational spring set of the auxiliary panel positioning mechanism comprises a contacting portion disposed inside the slot on the supporting component of the auxiliary panel positioning mechanism in a slidable manner, so as to constrain rotation of the holding component of the auxiliary panel positioning mechanism relative to the supporting component of the auxiliary panel positioning mechanism within a second range different from the first range.

18. The displaying device of claim 17, wherein the second range is greater than the first range.

19. The displaying device of claim 17, wherein the slot on the supporting component of the auxiliary panel positioning mechanism is an arc slot, and a curvature of the slot on the supporting component of the auxiliary panel positioning mechanism is substantially identical to a curvature of the slot on the supporting component of the panel positioning mechanism.

20. The displaying device of claim 17, wherein a length of the slot on the supporting component of the auxiliary panel positioning mechanism is greater than a length of the slot on the supporting component of the panel positioning mechanism.

* * * * *